(12) United States Patent
Yasuhiko et al.

(10) Patent No.: US 12,450,700 B2
(45) Date of Patent: Oct. 21, 2025

(54) IMAGE PROCESSING DEVICE, IMAGE PROCESSING METHOD, IMAGE PROCESSING PROGRAM, AND RECORDING MEDIUM

(71) Applicant: HAMAMATSU PHOTONICS K.K., Hamamatsu (JP)

(72) Inventors: Osamu Yasuhiko, Hamamatsu (JP); Kozo Takeuchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 400 days.

(21) Appl. No.: 18/009,054

(22) PCT Filed: May 24, 2021

(86) PCT No.: PCT/JP2021/019565
§ 371 (c)(1),
(2) Date: Dec. 8, 2022

(87) PCT Pub. No.: WO2022/004191
PCT Pub. Date: Jan. 6, 2022

(65) Prior Publication Data
US 2023/0252606 A1 Aug. 10, 2023

(30) Foreign Application Priority Data
Jul. 2, 2020 (JP) .................................. 2020-115064

(51) Int. Cl.
*G06T 5/70* (2024.01)
(52) U.S. Cl.
CPC ...... *G06T 5/70* (2024.01); *G06T 2207/10056* (2013.01)
(58) Field of Classification Search
CPC ............. G06T 5/70; G06T 2207/10056; G06T 2207/20224; G06T 2207/30024;
(Continued)

(56) References Cited

U.S. PATENT DOCUMENTS

2003/0136907 A1* 7/2003 Takane .................... G06T 5/70
250/310
2005/0053306 A1 3/2005 Kuwabara
(Continued)

FOREIGN PATENT DOCUMENTS

CN 1299061 A 6/2001
JP H09-15504 A 1/1997
(Continued)

OTHER PUBLICATIONS

International Preliminary Report on Patentability mailed Jan. 12, 2023 for PCT/JP2021/019565.
(Continued)

*Primary Examiner* — Jose L Couso
(74) *Attorney, Agent, or Firm* — Faegre Drinker Biddle & Reath LLP

(57) ABSTRACT

In a noise estimation step, a noise image included in a target image including linear noises extending along a first direction is estimated. In this case, an evaluation function including a first term representing a difference between a result obtained by performing differentiation processing in a second direction and low frequency component extraction processing in the first direction on the target image and a result obtained by performing differentiation processing in the second direction and low frequency component extraction processing in the first direction on the noise image is used to obtain the noise image which minimizes a value of the evaluation function. In a noise reduction step, a noise reduced image is generated from the target image based on the target image and the noise image.

11 Claims, 13 Drawing Sheets

(58) Field of Classification Search
CPC ............ G06T 2207/20182; G06T 5/20; G06T 2207/10008; G06T 2207/30004; G06T 5/10; G06T 5/50; A61B 6/5258; A61B 5/7203; A61B 5/7207; G01N 15/1434; G01N 15/1436; G01N 15/147; G01N 2015/1454; G01N 2015/1497; G01N 21/45; G01N 23/041; G01N 2223/401; G01N 23/04; G01B 2290/70; G01B 9/02024; G01B 9/02087; G01B 9/04; G02B 21/14; H01J 2237/221; H01J 2237/226; H01J 2237/2505; H01J 37/26; H04N 1/4092

See application file for complete search history.

(56) References Cited

U.S. PATENT DOCUMENTS

2015/0204728 A1* 7/2015 Liu .................... G01N 15/1434
356/497
2019/0072477 A1* 3/2019 Yamada ............... G01N 15/147

FOREIGN PATENT DOCUMENTS

| JP | 2005-084902 A | | 3/2005 | |
|---|---|---|---|---|
| JP | 2009-285329 A | | 12/2009 | |
| JP | 2013102951 A | * | 5/2013 | ........... G01N 23/041 |
| JP | 2014108358 A | * | 6/2014 | ........... G01N 23/041 |
| WO | WO-03062743 A1 | * | 7/2003 | ......... G01B 9/02087 |
| WO | WO-2017/159387 A1 | | 9/2017 | |

OTHER PUBLICATIONS

Arnison, M. R., et al., "Using the Hilbert transform for 3D visualization of differential interference contrast microscope images," Journal of Microscopy, vol. 199, Pt 1, 2000, pp. 79-84.

* cited by examiner (a)

(b)

(a)

(b)

(a)

(b)

(c)

(a)

(b)

(c)

(a)

(b)

(a)

(b)

(a)

(b)

(a)

(b)

IMAGE PROCESSING DEVICE, IMAGE PROCESSING METHOD, IMAGE PROCESSING PROGRAM, AND RECORDING MEDIUM

TECHNICAL FIELD

The present disclosure relates to an image processing apparatus, an image processing method, an image processing program, and a recording medium.

BACKGROUND ART

There are several known techniques for generating a phase differential image based on one or a plurality of interference images acquired by an apparatus to which a differential interference contrast microscope is applied, and further, acquiring a phase image based on the phase differential image. In these techniques, the phase image can be generated by performing integration processing or deconvolution processing on the phase differential image. These techniques are suitably used, for example, when acquiring the phase image of a cell.

The phase image generated as described above may include a linear noise (linear artifact) extending along one direction, and in this case, the image often includes a plurality of linear noises parallel to each other. As the image including the linear noises extending along one direction, there is not only the phase image acquired using the apparatus to which the differential interference contrast microscope is applied but also other types of images.

Non Patent Document 1 describes a technique capable of generating an image in which noises are reduced by processing a target image including linear noises extending along one direction.

CITATION LIST

Non Patent Literature

Non Patent Document 1: M. R. ARNISON et al., "Using the Hilbert transform for 3D visualization of differential interference contrast microscope images", Journal of Microscopy, Vol. 199 Pt 1, pp. 79-84 (2000)

SUMMARY OF INVENTION

Technical Problem

However, in the technique described in Non Patent Document 1, although the noise reduced image can be generated from the target image, even when the target image has quantitativeness, the quantitativeness is lost in the image after noise reduction processing.

An object of an embodiment is to provide an image processing apparatus, an image processing method, an image processing program, and a recording medium capable of processing a target image including linear noises extending along one direction and generating an image after noise reduction processing in which quantitativeness of the target image is maintained.

Solution to Problem

An embodiment is an image processing apparatus. The image processing apparatus is an apparatus for processing a target image including linear noises extending along a first direction and generating a noise reduced image, and includes a noise estimation unit for estimating a noise image included in the target image; and a noise reduction unit for generating the noise reduced image from the target image based on the target image and the noise image, and the noise estimation unit uses an evaluation function including a first term representing a difference between a result obtained by performing differentiation processing in a second direction perpendicular to the first direction and low frequency component extraction processing in the first direction on the target image and a result obtained by performing differentiation processing in the second direction and low frequency component extraction processing in the first direction on the noise image, and obtains the noise image which minimizes a value of the evaluation function.

An embodiment is an image processing method. The image processing method is a method for processing a target image including linear noises extending along a first direction and generating a noise reduced image, and includes a noise estimation step of estimating a noise image included in the target image; and a noise reduction step of generating the noise reduced image from the target image based on the target image and the noise image, and in the noise estimation step, an evaluation function including a first term representing a difference between a result obtained by performing differentiation processing in a second direction perpendicular to the first direction and low frequency component extraction processing in the first direction on the target image and a result obtained by performing differentiation processing in the second direction and low frequency component extraction processing in the first direction on the noise image is used, and the noise image which minimizes a value of the evaluation function is obtained.

An embodiment is an image processing program. The image processing program is a program for causing a computer to execute the steps of the above image processing method.

An embodiment is a recording medium. The recording medium is a computer readable medium recording the above image processing program.

Advantageous Effects of Invention

According to the image processing apparatus, the image processing method, the image processing program, and the recording medium of the embodiments, it is possible to process a target image including linear noises extending along one direction and generate an image after noise reduction processing in which quantitativeness of the target image is maintained.

DESCRIPTION OF EMBODIMENTS

Hereinafter, embodiments of an image processing apparatus, an image processing method, an image processing program, and a recording medium will be described in detail with reference to the accompanying drawings. In the description of the drawings, the same elements will be denoted by the same reference signs, and redundant description will be omitted. The present invention is not limited to these examples.

Figure 1:
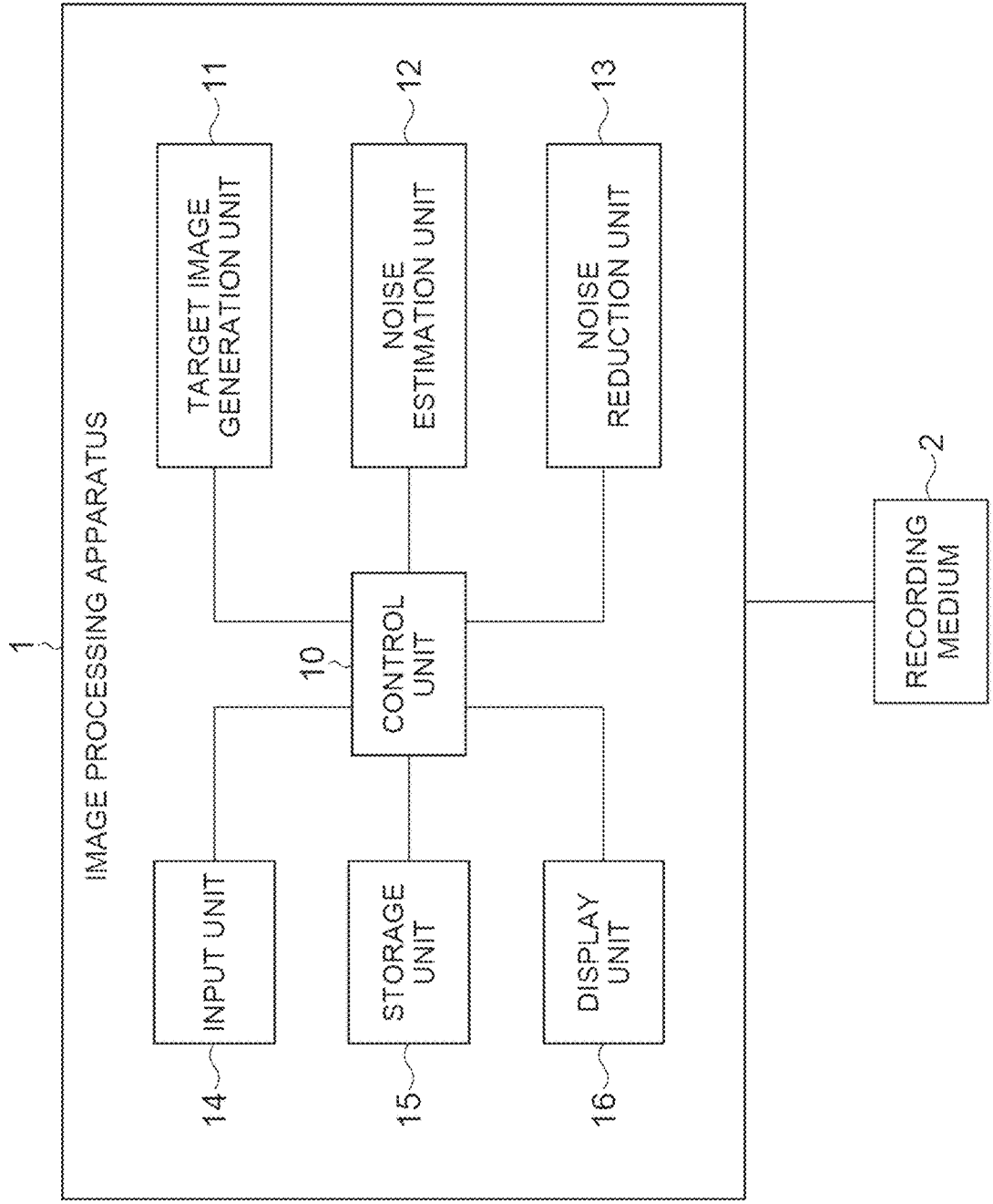
FIG. 1 is a diagram illustrating a configuration of an image processing apparatus 1 according to an embodiment.

FIG. 1 is a diagram illustrating a configuration of an image processing apparatus 1 according to the present embodiment. The image processing apparatus 1 includes a control unit 10, a target image generation unit 11, a noise estimation unit 12, a noise reduction unit 13, an input unit 14, a storage unit 15, and a display unit 16. The image processing apparatus 1 may be a computer. The control unit 10 is a unit for controlling operations of the target image generation unit 11, the noise estimation unit 12, the noise reduction unit 13, the input unit 14, the storage unit 15, and the display unit 16, and includes a CPU.

The target image generation unit 11, the noise estimation unit 12, and the noise reduction unit 13 are units for performing image processing, and include a processing device such as a CPU, a DSP, or an FPGA. The input unit 14 inputs data of an image to be processed, and inputs image processing conditions using a keyboard or a mouse.

The storage unit 15 is a unit for storing data of various images, and includes a hard disk drive, a flash memory, a RAM, a ROM, and the like. In addition, the target image generation unit 11, the noise estimation unit 12, the noise reduction unit 13, and the storage unit 15 may be configured by cloud computing. The display unit 16 is a unit for displaying images to be processed, images during processing, images after processing, and the like, and includes, for example, a liquid crystal display.

The storage unit 15 also stores a program for causing the target image generation unit 11, the noise estimation unit 12, and the noise reduction unit 13 to execute respective steps of the image processing. The image processing program may be stored in the storage unit 15 at the time of manufacture or shipment of the image processing apparatus 1, may be acquired via a communication line after shipment and then stored in the storage unit 15, or may be recorded in a computer readable recording medium 2 and then stored in the storage unit 15. The recording medium 2 may be an arbitrary medium such as a flexible disk, a CD-ROM, a DVD-ROM, a BD-ROM, or a USB memory.

Figure 2:
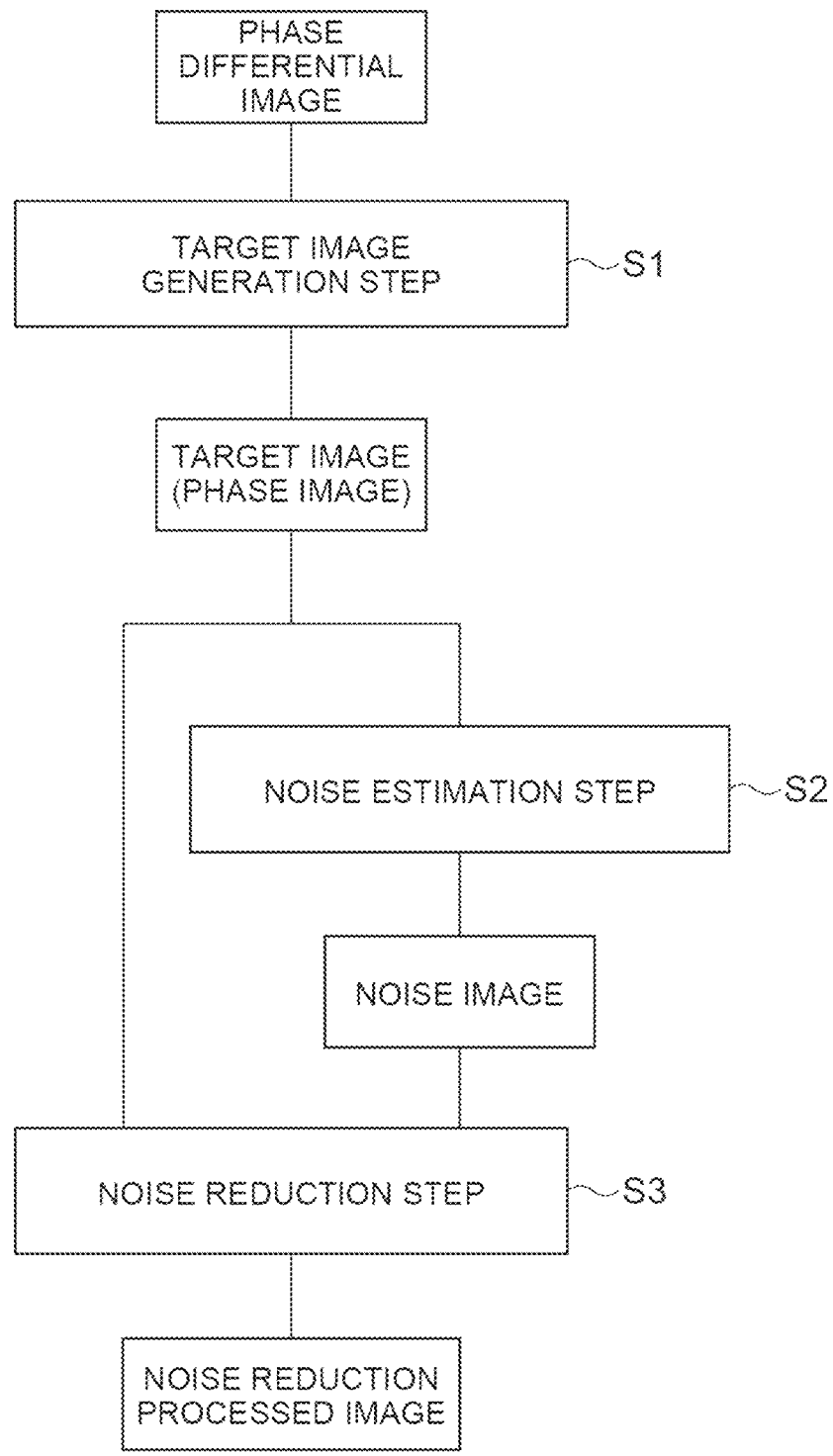
FIG. 2 is a flowchart illustrating an image processing method according to an embodiment.

FIG. 2 is a flowchart illustrating an image processing method according to the present embodiment. The image processing method of the present embodiment includes a target image generation step S1, a noise estimation step S2, and a noise reduction step S3.

The target image generation step S1 is a process performed by the target image generation unit 11. The noise estimation step S2 is a process performed by the noise estimation unit 12. The noise reduction step S3 is a process performed by the noise reduction unit 13. As an example, a case where a phase image is generated from a phase differential image in the target image generation step S1 will be described.

In the target image generation step S1, the target image generation unit 11 generates the phase image by performing integration processing or deconvolution processing on the phase differential image. The above generated phase image is a target image serving as a target of noise reduction processing.

In the noise estimation step S2, the noise estimation unit 12 estimates a noise image included in the target image (phase image). In the noise reduction step S3, the noise reduction unit 13 generates a noise reduced image (noise reduction processed image) from the target image based on the target image and the noise image. Specifically, the noise reduction processed image can be generated by subtracting the noise image from the target image. Hereinafter, the respective steps will be described in detail with reference to specific image examples.

Figure 3:
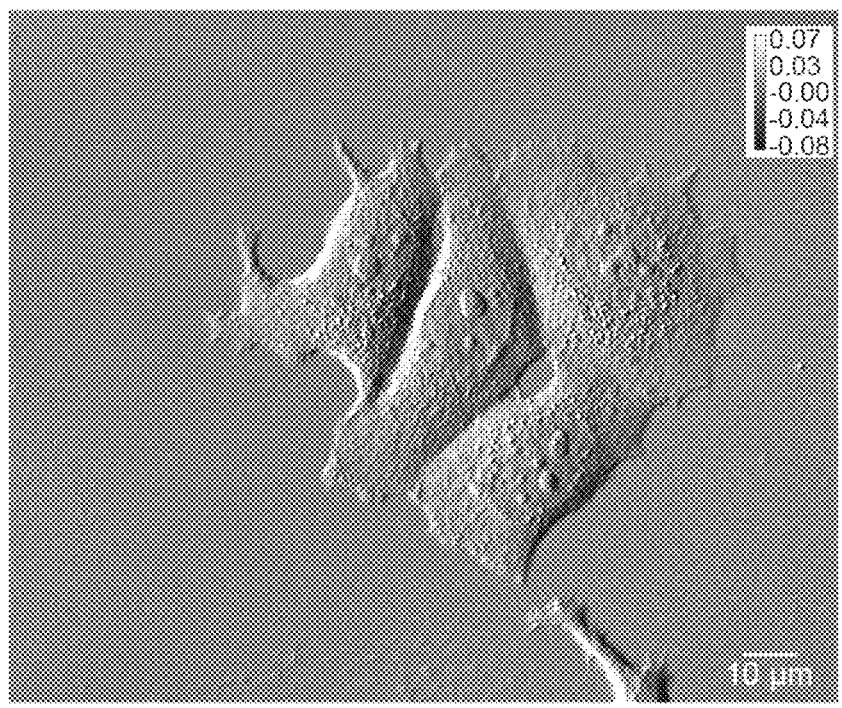
FIG. 3 includes (a) a diagram showing a phase differential image, and (b) a diagram showing a phase image.
Figure 3:
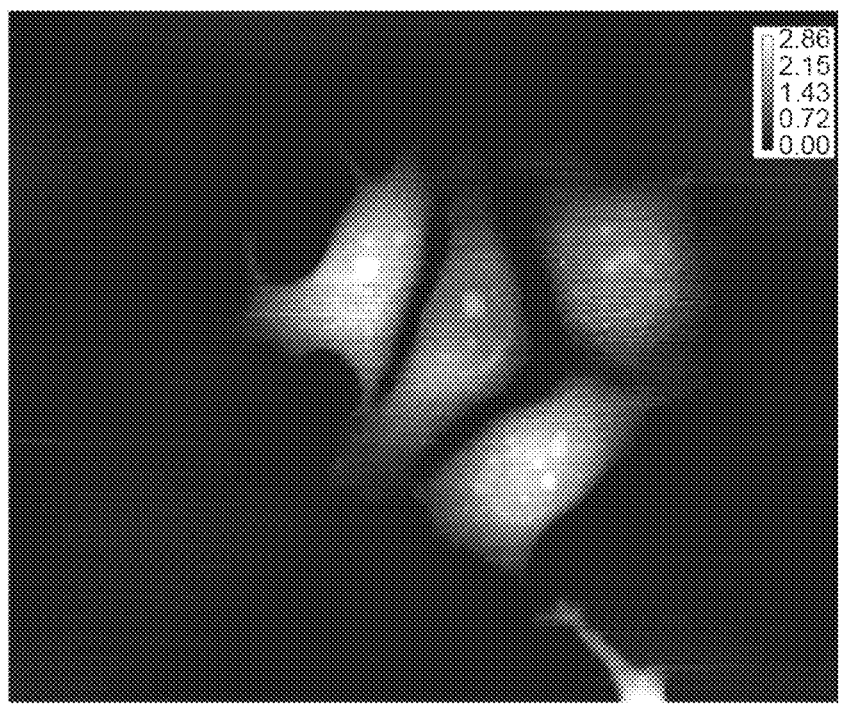

(a) in FIG. 3 is a diagram showing a phase differential image. The phase differential image is generated from an interference image acquired by an apparatus to which a differential interference contrast microscope is applied. A shear direction in the differential interference contrast microscope is the horizontal direction in the diagram. The phase differential image shows, in addition to several cells being an observation target, a background region in which a phase is substantially uniform (that is, a phase differential is substantially 0) around the cells.

(b) in FIG. 3 is a diagram showing a phase image. The phase image is generated by performing integration processing on the phase differential image of (a) in FIG. 3 by the target image generation unit 11 in the target image generation step S1. Specifically, the phase image to be obtained is set to x, differentiation processing in a first direction (horizontal direction, shear direction in the diagram) on the phase image x is set to A, the phase differential image is set to b, and a positive constant is set to λ, and the phase image x can be obtained by solving the optimization problem represented by the following Formula (1).

[Formula 1]

$$\min_{x \geq 0} \|Ax - b\|_2^2 + \lambda \|x\|_{l=1 \text{ or } 2} \tag{1}$$

In the above description, λ is set to, for example, a value in a range of $10^{-5}$ to $10^{-2}$. The phase image x can be obtained as an image which minimizes a difference between a result Ax obtained by performing the differentiation processing A in the first direction on the phase image x and the phase differential image b, under the constraint condition that the phase value is 0 or more. As shown in the diagram, the phase image x includes linear noises (linear artifacts) extending along the first direction (horizontal direction in the diagram).

Figure 4:
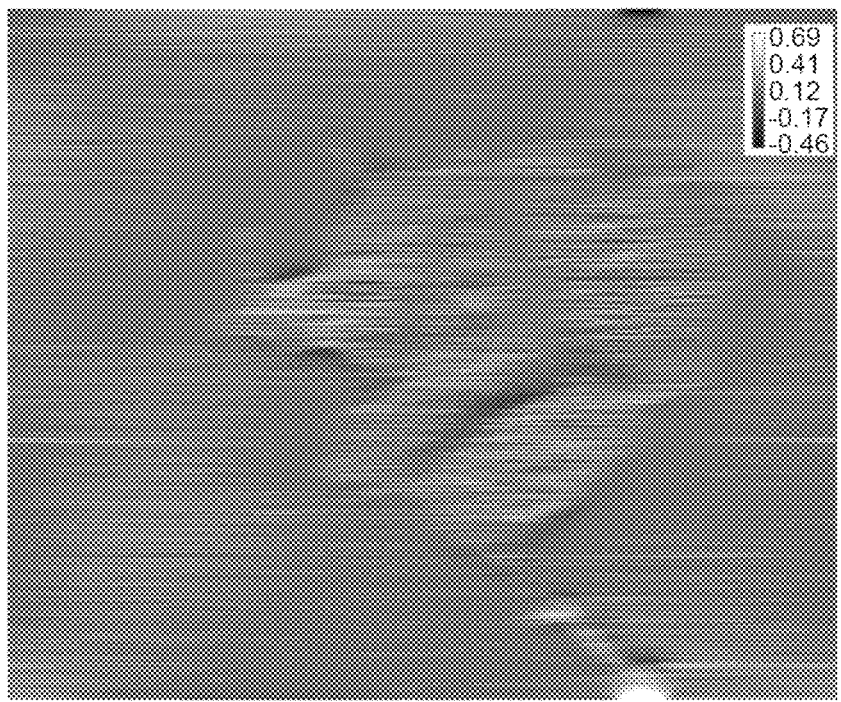
FIG. 4 includes (a) a diagram showing a noise image, and (b) a diagram showing a noise reduction processed image.
Figure 4:
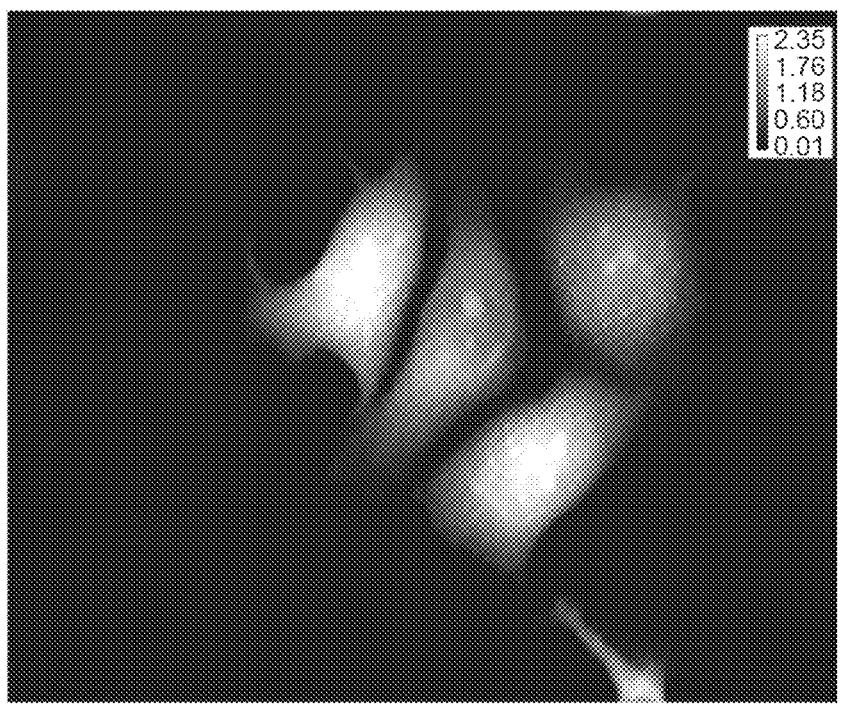

(a) in FIG. 4 is a diagram showing a noise image. The noise image is estimated as an image included in the phase image (target image serving as a target of noise reduction processing) of (b) in FIG. 3 by the noise estimation unit 12 in the noise estimation step S2. Details of the estimation processing of the noise image in the noise estimation step S2 will be described later.

(b) in FIG. 4 is a diagram showing a noise reduction processed image. The noise reduction processed image is generated by subtracting the noise image of (a) in FIG. 4 from the target image (phase image) of (b) in FIG. 3 by the noise reduction unit 13 in the noise reduction step S3. As shown in the diagram, in the image after the noise reduction processing, the noises included in the target image are reduced, and in addition, the quantitativeness of the target image is maintained.

Next, the processing of estimating the noise image included in the target image in the noise estimation step S2 will be described in detail. The target image is set to x, and the noise image included in the target image x is set to y.

Low frequency component extraction processing in the first direction (horizontal direction in the diagram) on the image is set to $L_1$, and high frequency component extraction processing in the first direction on the image is set to $L_2$. Differentiation processing in a second direction (vertical direction perpendicular to the first direction in the diagram) on the image is set to D, and processing for extracting the background region in the image is set to M. Further, positive constants are set to λ and μ.

In the above description, for example, λ is set to a value in a range of $10^{-3}$ to $10^{-1}$, and μ is set to a value in a range of $10^{-2}$ to 1. The noise image y is estimated by solving the optimization problem represented by the following Formula (2), for an evaluation function E(x,y) represented by the following Formula (3).

[Formula 2]

$$\min_{y} E(x, y) \tag{2}$$

[Formula 3]

$$E(x, y) = \|L_1 Dy - L_1 Dx\|_2^2 + \lambda \|My - Mx\|_2^2 + \mu \|L_2 y\|_2^2 \tag{3}$$

A first term in the evaluation function E(x,y) represented by the above Formula (3) represents a difference between a result $L_1 Dx$ obtained by performing the differentiation processing D in the second direction and the low frequency component extraction processing $L_1$ in the first direction on the target image x and a result $L_1 Dy$ obtained by performing the differentiation processing D in the second direction and the low frequency component extraction processing $L_1$ in the first direction on the noise image y. The order of the differentiation processing D and the low frequency component extraction processing $L_1$ on each image is arbitrary. Further, the differentiation processing D and the low frequency component extraction processing $L_1$ may be performed on a difference between the target image x and the noise image y.

The linear noises (linear artifacts) included in the target image extend along the first direction (horizontal direction) of the target image, and thus, a change of the noises is large along the second direction, and a spatial frequency of the noises is low along the first direction. Therefore, the noise image y can be obtained as an image which minimizes the first term of the evaluation function E(x,y).

Figure 5:
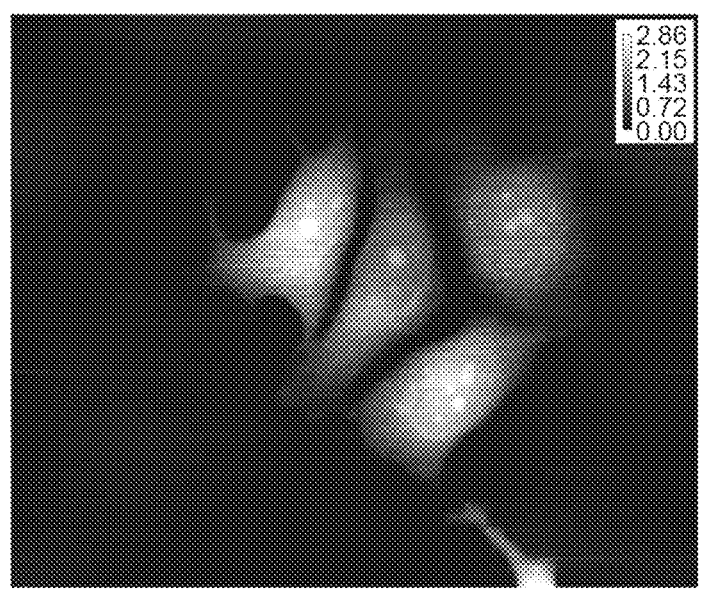
FIG. 5 includes (a) a diagram showing a target image x, (b) a diagram showing an image Dx of a result obtained by performing differentiation processing D in a second direction on the target image x of (a), and (c) a diagram showing an image $L_1Dx$ of a result obtained by performing low frequency component extraction processing $L_1$ in a first direction on the image Dx of (b).
Figure 5:
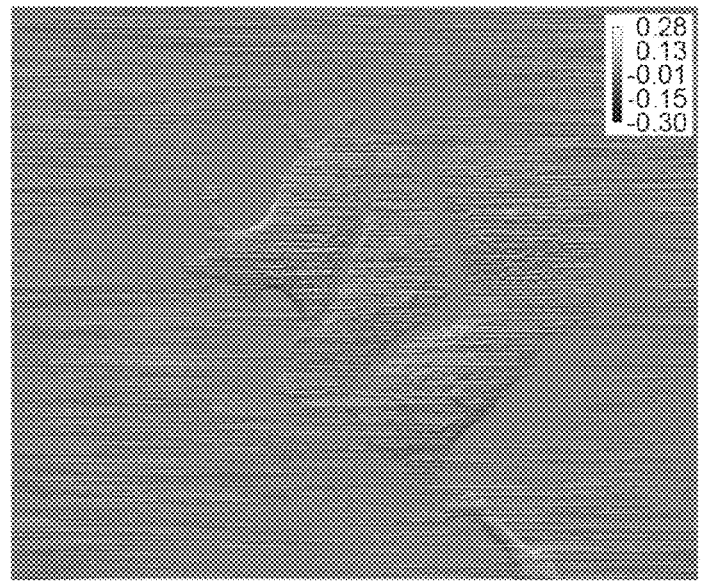
Figure 5:
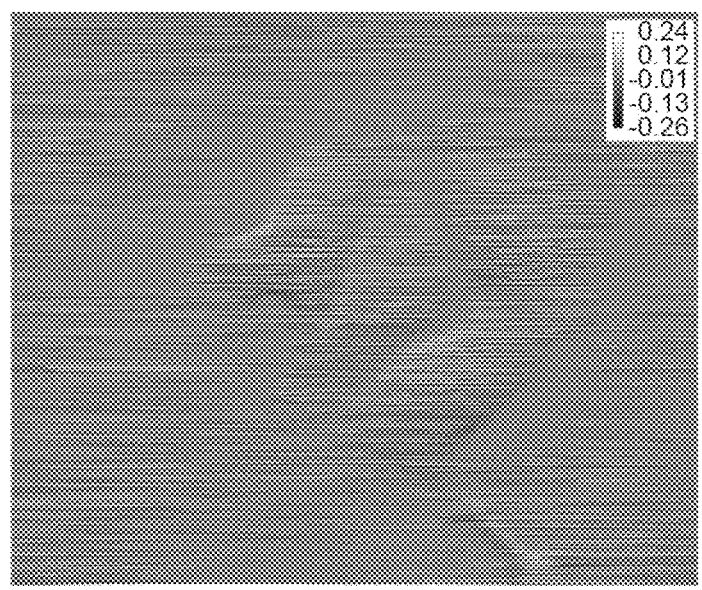
Figure 6:
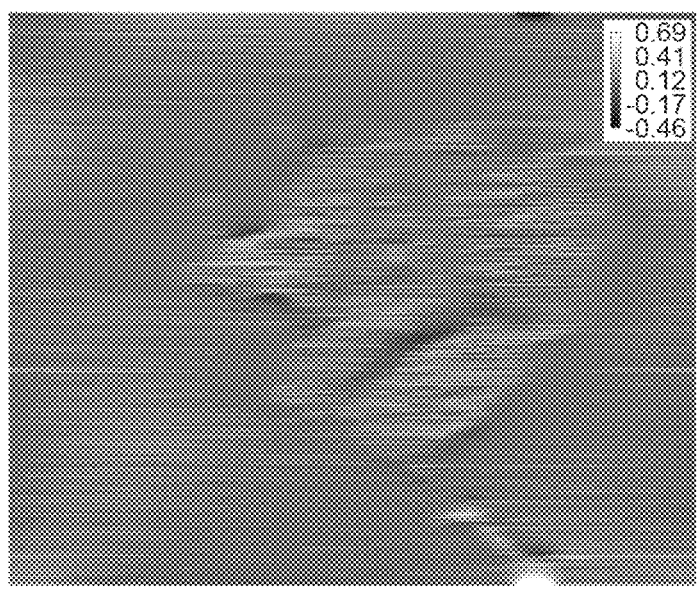
FIG. 6 includes (a) a diagram showing a noise image y during estimation processing, (b) a diagram showing an image Dy of a result obtained by performing differentiation processing D in the second direction on the noise image y of (a), and (c) a diagram showing an image $L_1$Dy of a result obtained by performing low frequency component extraction processing $L_1$ in the first direction on the image Dy of (b).
Figure 6:
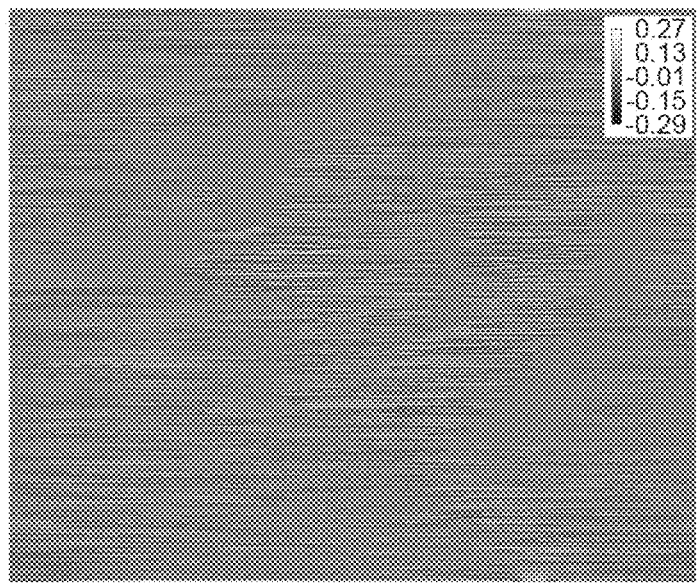
Figure 6:
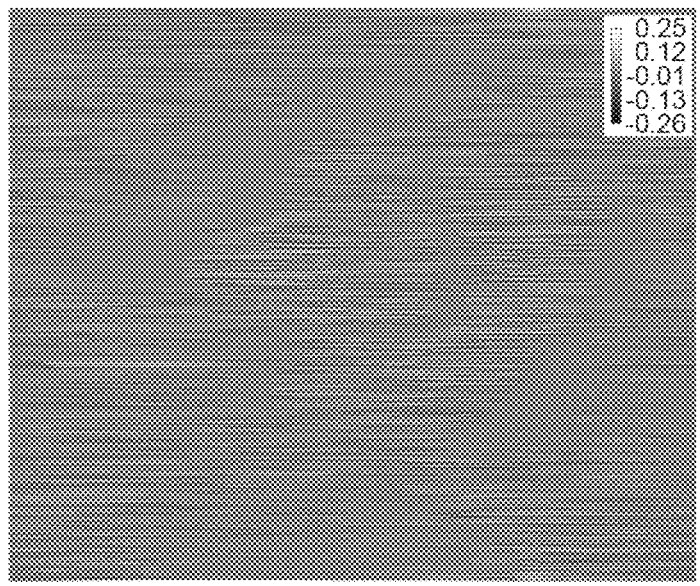

FIG. 5 and FIG. 6 include diagrams showing image examples for describing the first term of the evaluation function E(x,y). (a) in FIG. 5 is a diagram showing the target image x. (b) in FIG. 5 is a diagram showing the image Dx of the result obtained by performing the differentiation processing D in the second direction on the target image x of (a) in FIG. 5. In the image Dx, the noises are clearly shown, and further, information (high frequency components) of the observation target is also shown.

(c) in FIG. 5 is a diagram showing the image $L_1 Dx$ of the result obtained by performing the low frequency component extraction processing $L_1$ in the first direction on the image Dx of (b) in FIG. 5. In the image $L_1 Dx$, low frequency components are extracted.

(a) in FIG. 6 is a diagram showing the noise image y during the estimation processing. (b) in FIG. 6 is a diagram showing the image Dy of the result obtained by performing the differentiation processing D in the second direction on the noise image y of (a) in FIG. 6. Ideally, the information (high frequency components) of the observation target does not exist in the noise image at the end of the estimation processing, but the information (high frequency components) of the observation target exists in the image Dy during the estimation processing.

(c) in FIG. 6 is a diagram showing the image $L_1 Dy$ of the result obtained by performing the low frequency component extraction processing $L_1$ in the first direction on the image Dy of (b) in FIG. 6. The noise image at the end of the estimation processing ideally has no information (high frequency components) of the observation target, and thus, the image $L_1 Dy$ is substantially the same as the image Dy.

The first term of the evaluation function E(x,y) represents the difference between the image $L_1 Dx$ of (c) in FIG. 5 and the image $L_1 Dy$ of (c) in FIG. 6. The noise image y which minimizes the difference is obtained.

A second term in the evaluation function E(x,y) represented by the above Formula (3) represents a difference between a result Mx obtained by performing the background region extraction processing M on the target image x and a result My obtained by performing the background region extraction processing M on the noise image y. The background region extraction processing M may be performed on a difference between the target image x and the noise image y. In both of the target image x and the noise image y, in the background region, the information of the observation target does not exist, and only the noise exists. Therefore, the noise image y can be obtained as an image which minimizes the second term of the evaluation function E(x,y).

Figure 7:
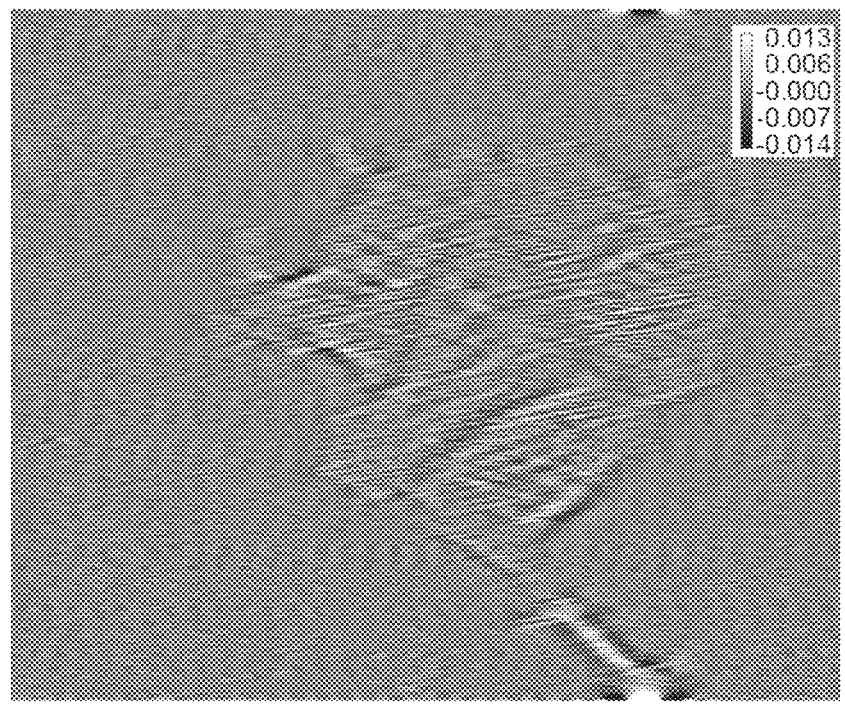
FIG. 7 is a diagram showing an image $L_2$y of a result obtained by performing high frequency component extraction processing $L_2$ in the first direction on the noise image y during the estimation processing of (a) in FIG. 6.

A third term in the evaluation function E(x,y) represented by the above Formula (3) represents a result $L_2y$ obtained by performing the high frequency component extraction processing $L_2$ in the first direction on the noise image y. Along the first direction, the spatial frequency of the noises is lower than the spatial frequency of the information of the observation target, and does not include high components. Therefore, the noise image y can be obtained as an image which minimizes the third term of the evaluation function E(x,y). FIG. 7 is a diagram showing the image $L_2y$ of the result obtained by performing the high frequency component extraction processing $L_2$ in the first direction on the noise image y during the estimation processing of (a) in FIG. 6.

In general, it is not possible to obtain the noise image y which simultaneously minimizes all of the first term, the second term, and the third term of the evaluation function E(x,y) represented by the above Formula (3). Accordingly, the noise image y is estimated by solving the optimization problem represented by the above Formula (2) so as to minimize the evaluation function E(x,y) represented by a linear sum of the first term, the second term, and the third term using the constants λ and μ as in the above Formula (3).

In addition, the evaluation function E(x,y) needs to include the first term in the above Formula (3), but may not include both or one of the second term and the third term in the above Formula (3).

That is, the evaluation function E(x,y) may be represented by any one of the following Formula (4), Formula (5), and Formula (6) with the value of the constant λ or μ being 0 in the above Formula (3).

[Formula 4]

$$E(x,y) = \|L_1Dy - L_1Dx\|_2^2 + \mu\|L_2y\|_2^2 \quad (4)$$

[Formula 5]

$$E(x,y) = \|L_1Dy - L_1Dx\|_2^2 + \lambda\|My - Mx\|_2^2 \quad (5)$$

[Formula 6]

$$E(x,y) = \|L_1Dy - L_1Dx\|_2^2 \quad (6)$$

Next, the noise image and the image after the noise reduction processing obtained when the evaluation function E(x,y) of each of the above Formulas (3) to (6) is used will be described. In each of the cases, the phase image shown in (b) in FIG. 3 is set as the target image x being the target of the noise reduction processing.

When the evaluation function E(x,y) of the above Formula (3) is used, the noise image y shown in (a) in FIG. 4 is obtained in the noise estimation step S2, and the noise reduction processed image shown in (b) in FIG. 4 is obtained in the noise reduction step S3. In this case, $\lambda = 1 \times 10^{-2}$, and $\mu = 1 \times 10 - 1$. The noise reduction processed image sufficiently reduces the noises included in the target image, and further, sufficiently maintains the quantitativeness of the target image.

Figure 8:
FIG. 8 includes (a) a diagram showing a noise image obtained when an evaluation function E(x,y) of Formula (4) is used, and (b) a diagram showing a noise reduction processed image obtained when the evaluation function E(x,y) of Formula (4) is used.
Figure 8:
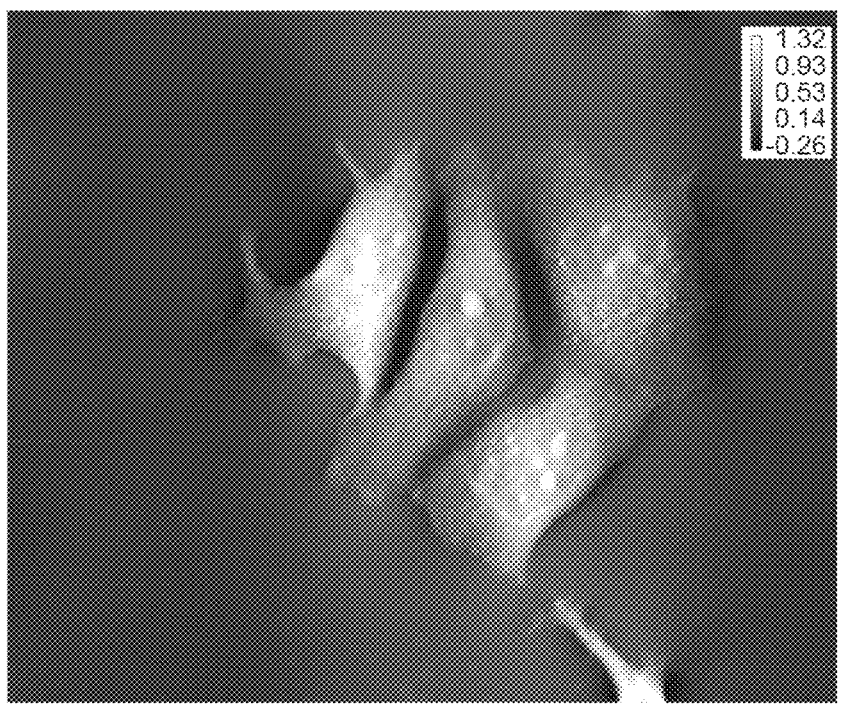

When the evaluation function E(x,y) of the above Formula (4) is used, the noise image y shown in (a) in FIG. 8 is obtained in the noise estimation step S2, and the noise reduction processed image shown in (b) in FIG. 8 is obtained in the noise reduction step S3. In this case, $\mu = 1 \times 10^{-1}$. The noise image y obtained in this case includes the information of the observation target. Therefore, the noises are reduced, and although some information of the observation target is also lost, the noise reduction processed image maintains the quantitativeness of the target image relatively well.

Figure 9:
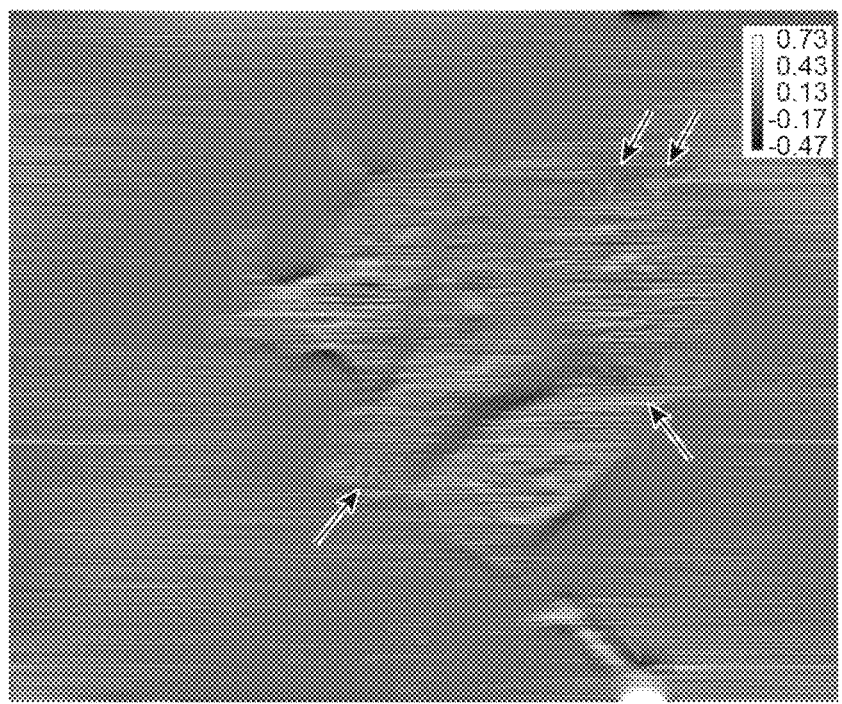
FIG. 9 includes (a) a diagram showing a noise image obtained when an evaluation function E(x,y) of Formula (5) is used, and (b) a diagram showing a noise reduction processed image obtained when the evaluation function E(x,y) of Formula (5) is used.
Figure 9:
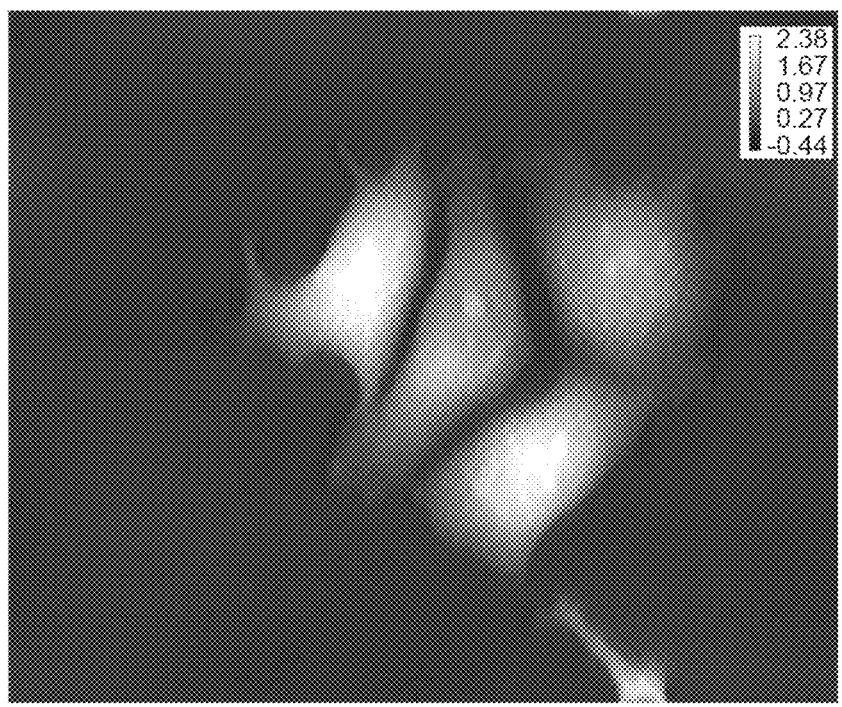

When the evaluation function E(x,y) of the above Formula (5) is used, the noise image y shown in (a) in FIG. 9 is obtained in the noise estimation step S2, and the noise reduction processed image shown in (b) in FIG. 9 is obtained in the noise reduction step S3. In this case, $\lambda = 1 \times 10^{-2}$. In the noise image y obtained in this case, calculation errors occur in portions indicated by arrows in the diagram. Therefore, the noise reduction processed image has incomplete noise reduction, but maintains the quantitativeness of the target image relatively well.

Figure 10:
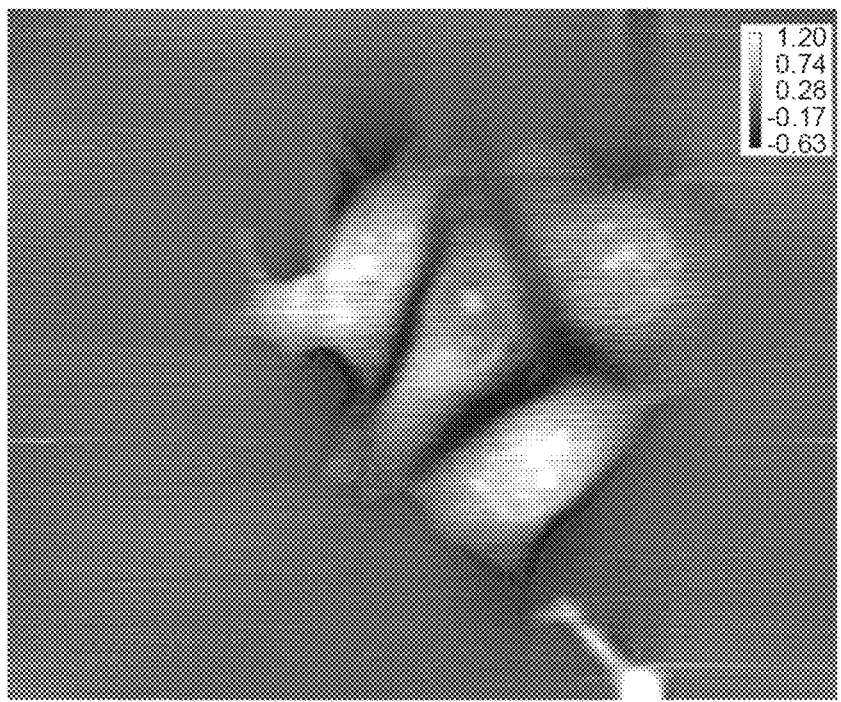
FIG. 10 includes (a) a diagram showing a noise image obtained when an evaluation function E(x,y) of Formula (6) is used, and (b) a diagram showing a noise reduction processed image obtained when the evaluation function E(x,y) of Formula (6) is used.
Figure 10:
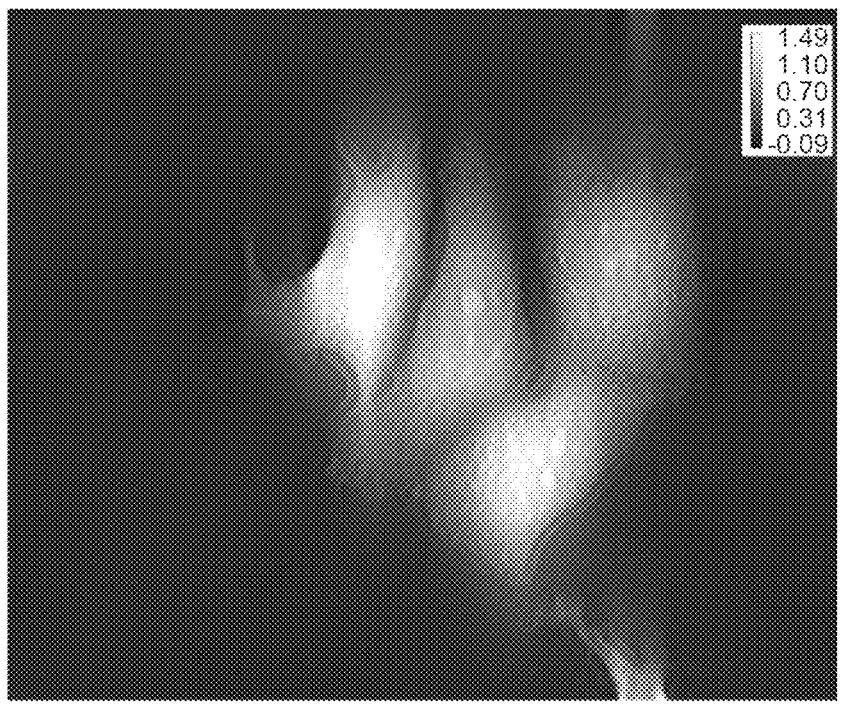

When the evaluation function E(x,y) of the above Formula (6) is used, the noise image y shown in (a) in FIG. 10 is obtained in the noise estimation step S2, and the noise reduction processed image shown in (b) in FIG. 10 is obtained in the noise reduction step S3. The noise image y obtained in this case includes the information of the observation target. Therefore, the noises are reduced, and although some information of the observation target is also lost, the noise reduction processed image maintains the quantitativeness of the target image relatively well.

Figure 11:
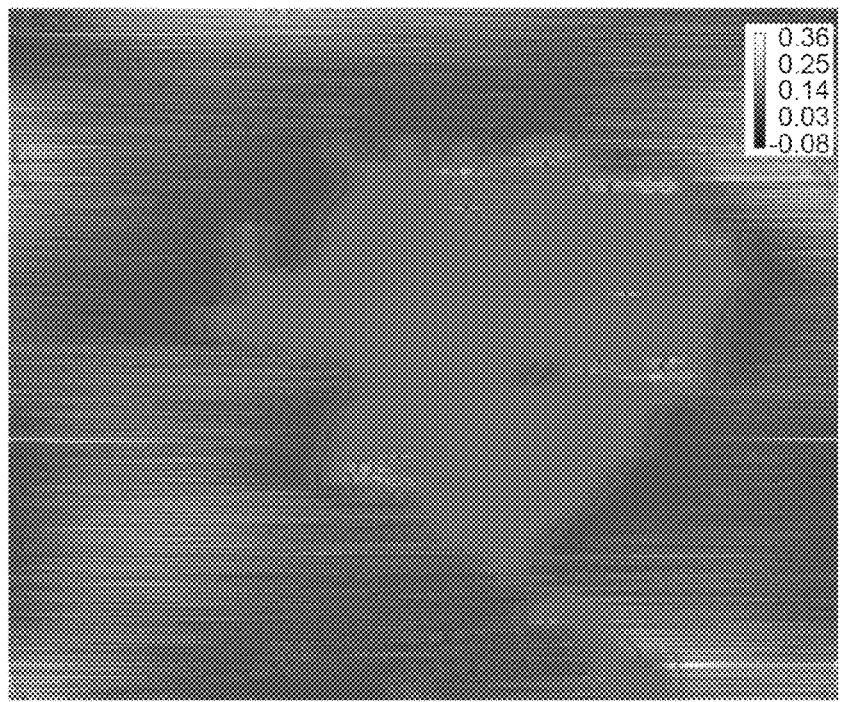
FIG. 11 includes (a) a diagram showing a noise image obtained when an evaluation function E(x,y) of Formula (7) is used, and (b) a diagram showing a noise reduction processed image obtained when the evaluation function E(x,y) of Formula (7) is used.
Figure 11:
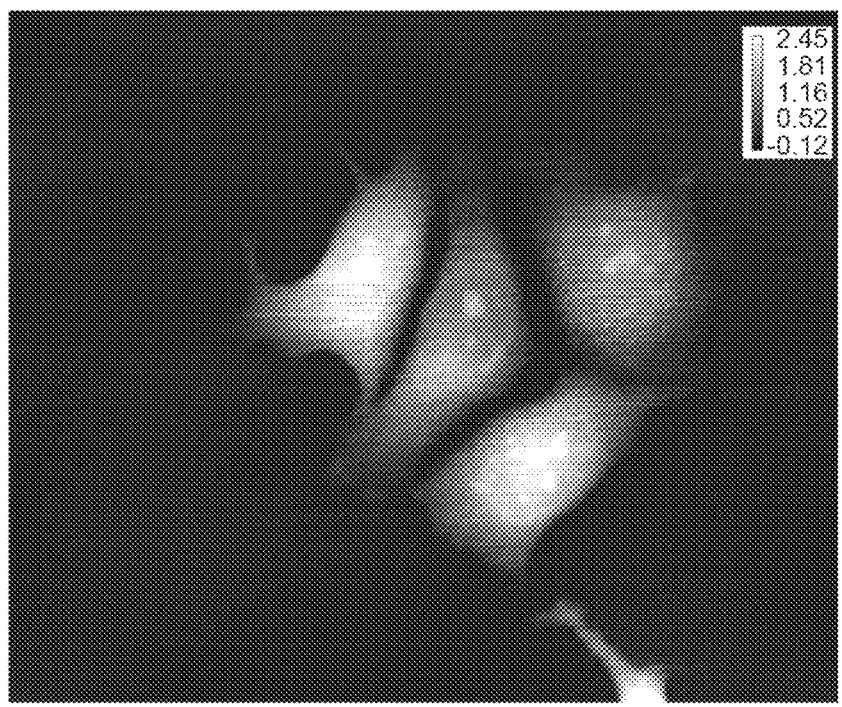

As a comparative example, when the evaluation function E(x,y) of the following Formula (7) not including the first term in the above Formula (3) is used, the noise image y shown in (a) in FIG. 11 is obtained in the noise estimation step S2, and the noise reduction processed image shown in (b) in FIG. 11 is obtained in the noise reduction step S3. In this case, $\lambda = 1 \times 10 - 1$, and $\mu = 1$. The noise image y obtained in this case fails to estimate the noises in a region where the observation target exists. Therefore, in the noise reduction processed image, the noises are not reduced in the region where the observation target exists.

[Formula 7]

$$E(x,y) = \lambda\|My - Mx\|_2^2 + \mu\|L_2y\|_2^2 \quad (7)$$

As described above, by solving the optimization problem represented by the above Formula (2) so as to minimize the evaluation function E(x,y) of any one the above Formulas (3) to (6), the noise image y can be estimated with high accuracy. Further, in the noise reduction processed image obtained based on the target image x and the noise image y, the noises included in the target image are reduced, and further, the quantitativeness of the target image is maintained. In addition, most preferably, the evaluation function E(x,y) of the above Formula (3) is used.

Figure 12:
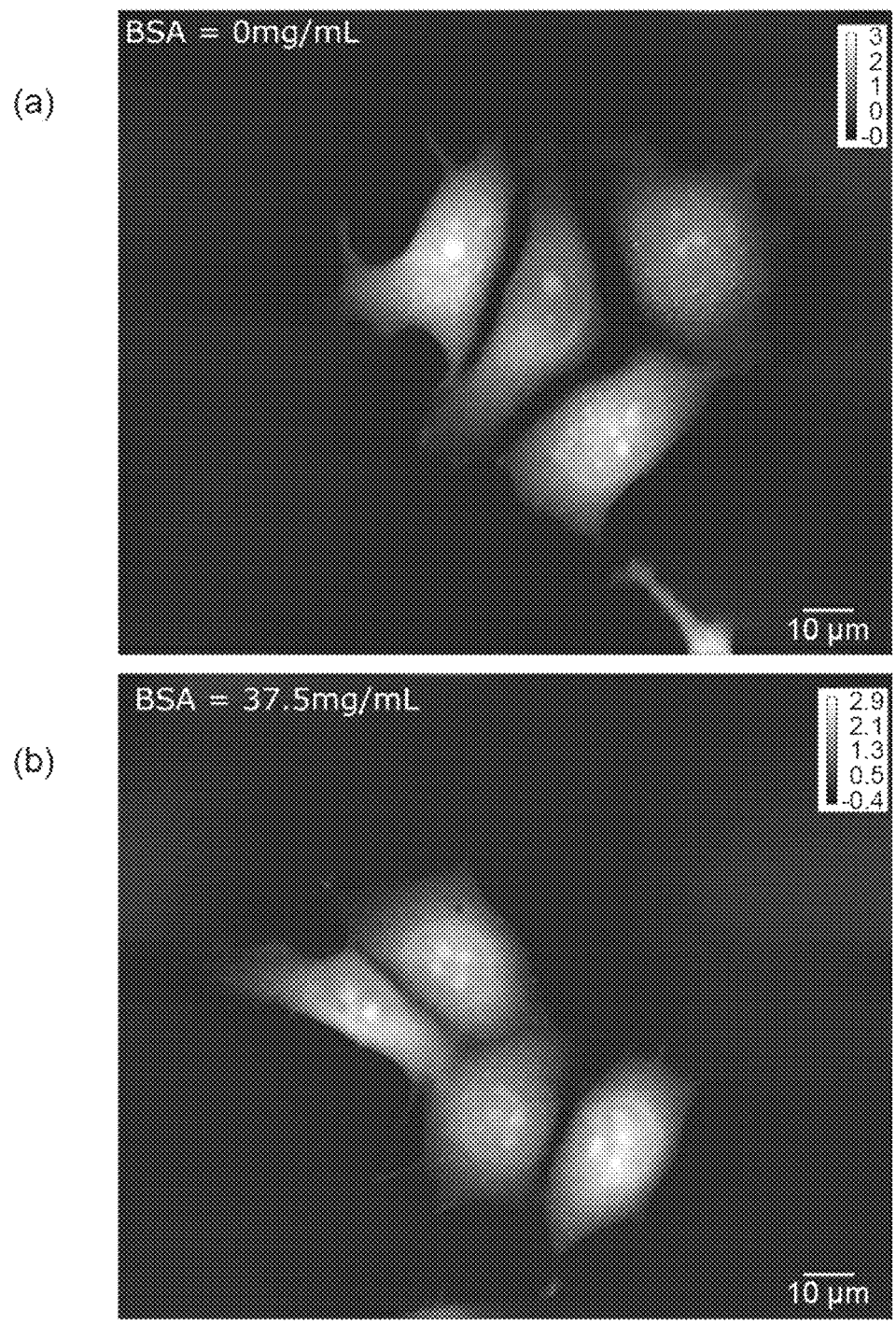
FIG. 12 includes (a) a diagram showing a noise reduction processed image obtained when a refractive index of a solution is set to about 1.335, and (b) a diagram showing a noise reduction processed image obtained when the refractive index of the solution is set to about 1.342.
Figure 13:
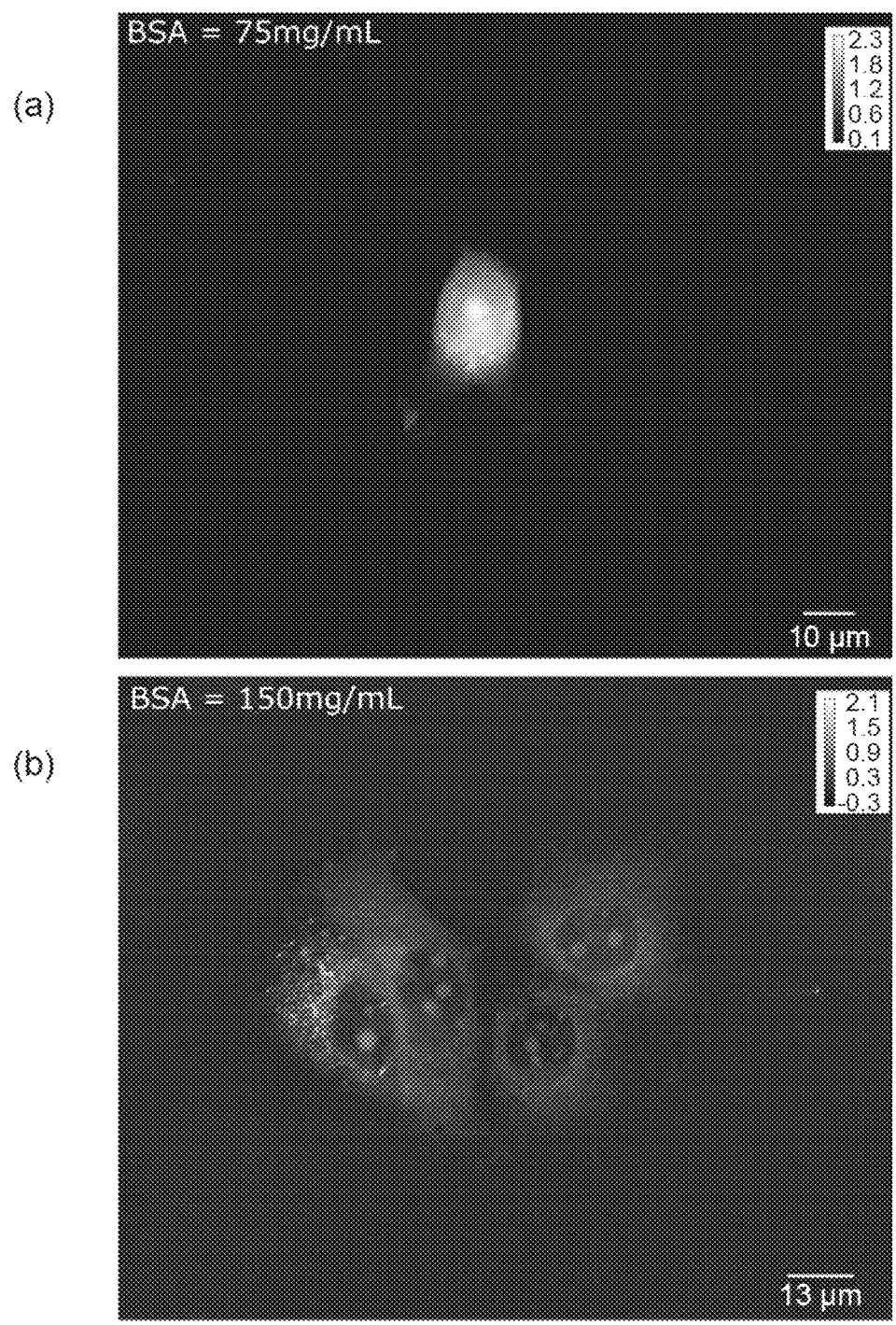
FIG. 13 includes (a) a diagram showing a noise reduction processed image obtained when the refractive index of the solution is set to about 1.349, and (b) a diagram showing a noise reduction processed image obtained when the refractive index of the solution is set to about 1.362.

FIG. 12 and FIG. 13 include diagrams each showing the noise reduction processed image being obtained by the image processing method of the present embodiment when a refractive index of a solution in which the cell being the observation target is immersed is set to each value. The refractive index of the solution was adjusted by adjusting a concentration of BSA (bovine serum albumin) contained in the solution. The refractive index of the solution was measured using an ATAGO Abbe refractometer. The evaluation function E(x,y) of the above Formula (3) was used. In this case, $\lambda = 1 \times 10^{-2}$, and $\mu = 1 \times 10^{-1}$.

(a) in FIG. 12 is a diagram showing the noise reduction processed image obtained when the refractive index of the solution is set to about 1.335. (b) in FIG. 12 is a diagram showing the noise reduction processed image obtained when the refractive index of the solution is set to about 1.342. (a) in FIG. 13 is a diagram showing the noise reduction processed image obtained when the refractive index of the solution is set to about 1.349. (b) in FIG. 13 is a diagram showing the noise reduction processed image obtained when the refractive index of the solution is set to about 1.362.

As shown in these diagrams, regardless of the value of the refractive index of the solution, in the obtained noise reduction processed image, the noises included in the target image are reduced, and further, the quantitativeness of the target image is maintained. As the refractive index of the solution increases, the phase difference between the cell and the solution decreases.

As shown in (b) in FIG. 13, even when the phase difference between the cell and the solution is small, in the obtained noise reduction processed image, the noises included in the target image are sufficiently reduced. The refractive index of the solution when the phase difference between the cell and the solution becomes 0 can be determined with high accuracy as the refractive index of the cell.

The image processing apparatus, the image processing method, the image processing program, and the recording medium are not limited to the embodiments and configuration examples described above, and various other modifications are possible.

The image processing apparatus of the above embodiment is an apparatus for processing a target image including linear noises extending along a first direction and generating a noise reduced image, and includes a noise estimation unit for estimating a noise image included in the target image; and a noise reduction unit for generating the noise reduced image from the target image based on the target image and the noise image, and the noise estimation unit uses an evaluation function including a first term representing a difference between a result obtained by performing differentiation processing in a second direction perpendicular to the first direction and low frequency component extraction processing in the first direction on the target image and a result obtained by performing differentiation processing in the second direction and low frequency component extraction processing in the first direction on the noise image, and obtains the noise image which minimizes a value of the evaluation function.

In the above image processing apparatus, the noise estimation unit may obtain the noise image which minimizes the value of the evaluation function by using the evaluation function further including a second term representing a difference between a background region in the target image and a background region in the noise image.

In the above image processing apparatus, the noise estimation unit may obtain the noise image which minimizes the value of the evaluation function by using the evaluation function further including a third term representing a result obtained by performing high frequency component extraction processing in the first direction on the noise image.

The above image processing apparatus may further include a target image generation unit for generating the target image by performing integration processing or deconvolution processing in the first direction on a differential image.

In the above image processing apparatus, a phase image generated by performing integration processing or deconvolution processing in the first direction on a phase differential image may be used as the target image.

The image processing method of the above embodiment is a method for processing a target image including linear noises extending along a first direction and generating a noise reduced image, and includes a noise estimation step of estimating a noise image included in the target image; and a noise reduction step of generating the noise reduced image from the target image based on the target image and the noise image, and in the noise estimation step, an evaluation function including a first term representing a difference between a result obtained by performing differentiation processing in a second direction perpendicular to the first direction and low frequency component extraction processing in the first direction on the target image and a result obtained by performing differentiation processing in the second direction and low frequency component extraction processing in the first direction on the noise image is used, and the noise image which minimizes a value of the evaluation function is obtained.

In the above image processing method, in the noise estimation step, the noise image which minimizes the value of the evaluation function may be obtained by using the evaluation function further including a second term representing a difference between a background region in the target image and a background region in the noise image.

In the above image processing method, in the noise estimation step, the noise image which minimizes the value of the evaluation function may be obtained by using the evaluation function further including a third term representing a result obtained by performing high frequency component extraction processing in the first direction on the noise image.

The above image processing method may further include a target image generation step of generating the target image by performing integration processing or deconvolution processing in the first direction on a differential image.

In the above image processing method, a phase image generated by performing integration processing or deconvolution processing in the first direction on a phase differential image may be used as the target image.

The image processing program of the above embodiment is a program for causing a computer to execute the steps of the image processing method described above.

The recording medium of the above embodiment is a computer readable medium recording the image processing program described above.

INDUSTRIAL APPLICABILITY

The embodiments can be used as an image processing apparatus, an image processing method, an image processing program, and a recording medium capable of processing a target image including linear noises extending along one direction and generating an image after noise reduction processing in which quantitativeness of the target image is maintained.

REFERENCE SIGNS LIST

1—image processing apparatus, 2—recording medium, 10—control unit, 11—target image generation unit, 12—noise estimation unit, 13—noise reduction unit, 14—input unit, 15—storage unit, 16—display unit.

The invention claimed is:

1. An image processing apparatus for processing a target image including linear noises extending along a first direction and generating a noise reduced image, the apparatus comprising at least one processor configured to perform processes of:

a noise estimation unit configured to estimate a noise image included in the target image; and a noise reduction unit configured to generate the noise reduced image from the target image based on the target image and the noise image, wherein the noise estimation unit is configured to use an evaluation function including a first term representing a difference between a result obtained by performing differentiation processing in a second direction perpendicular to the first direction and low frequency component extraction processing in the first direction on the target image and a result obtained by performing differentiation processing in the second direction and low frequency component extraction processing in the first direction on the noise image, and obtain the noise image which minimizes a value of the evaluation function.

2. The image processing apparatus according to claim 1, wherein the noise estimation unit is configured to obtain the noise image which minimizes the value of the evaluation function by using the evaluation function further including a second term representing a difference between a background region in the target image and a background region in the noise image.

3. The image processing apparatus according to claim 1 wherein the noise estimation unit is configured to obtain the noise image which minimizes the value of the evaluation function by using the evaluation function further including a third term representing a result obtained by performing high frequency component extraction processing in the first direction on the noise image.

4. The image processing apparatus according to claim 1, wherein the at least one processor is configured to further perform a process of a target image generation unit configured to generate the target image by performing integration processing or deconvolution processing in the first direction on a differential image.

5. The image processing apparatus according to claim 1, wherein a phase image generated by performing integration processing or deconvolution processing in the first direction on a phase differential image is used as the target image.

6. An image processing method for processing a target image including linear noises extending along a first direction and generating a noise reduced image, the method comprising:

performing a noise estimation of estimating a noise image included in the target image; and performing a noise reduction of generating the noise reduced image from the target image based on the target image and the noise image, wherein in the noise estimation, an evaluation function including a first term representing a difference between a result obtained by performing differentiation processing in a second direction perpendicular to the first direction and low frequency component extraction processing in the first direction on the target image and a result obtained by performing differentiation processing in the second direction and low frequency component extraction processing in the first direction on the noise image is used, and the noise image which minimizes a value of the evaluation function is obtained.

7. The image processing method according to claim 6, wherein in the noise estimation, the noise image which minimizes the value of the evaluation function is obtained by using the evaluation function further including a second term representing a difference between a background region in the target image and a background region in the noise image.

8. The image processing method according to claim 6, wherein in the noise estimation, the noise image which minimizes the value of the evaluation function is obtained by using the evaluation function further including a third term representing a result obtained by performing high frequency component extraction processing in the first direction on the noise image.

9. The image processing method according to claim 6, further comprising performing a target image generation of generating the target image by performing integration processing or deconvolution processing in the first direction on a differential image.

10. The image processing method according to claim 6, wherein a phase image generated by performing integration processing or deconvolution processing in the first direction on a phase differential image is used as the target image.

11. A non-transitory computer readable medium storing thereon an image processing program, which, when executed by a computer, performs the image processing method according to claim 6.

* * * * *